Sept. 25, 1962   W. J. THOMPSON   3,055,614
AIR-EJECTOR AIRCRAFT
Filed May 12, 1960

Inventor
WENDELL J. THOMPSON

By R. J. Tompkins
Leo J. Maloni

Attorneys

United States Patent Office 3,055,614
Patented Sept. 25, 1962

3,055,614
AIR-EJECTOR AIRCRAFT
Wendell J. Thompson, 20701 Christine Ave.,
Torrance, Calif.
Filed May 12, 1960, Ser. No. 28,811
3 Claims. (Cl. 244—15)
(Granted under Title 35, U.S. Code (1952), sec. 266)

The invention described herein may be manufactured and used by or for the Government of the United States of America for governmental purposes without the payment of any royalties thereon or therefor.

The present invention relates to improvements in the aerodynamic characteristics of airfoils and more particularly to means especially designed to control the boundary layer of fluid on the surface of an airfoil moving through such fluid and to exhaust simultaneously therewith a sheet of fluid from within said airfoil into the low pressure area behind the trailing edge of the airfoil.

An object of this invention is to achieve an integrated design for an air-ejector aircraft to render such aircraft capable of extremely low speed flight without undue sacrifice of high speed performance.

Another object is to design means for producing integrated suction boundary layer control and super-circulation without the thrust penalties that cause poor low speed acceleration potential and decrease in high speed performance.

A further object is to produce a device for providing suction boundary layer control and super-circulation by the use of a minimum number of moving parts to avoid mechanical problems.

Still a further object is to produce a novel engine exhaust design to provide integrated suction boundary layer control, super-circulation and cooling of the exhaust duct.

Figure 1:
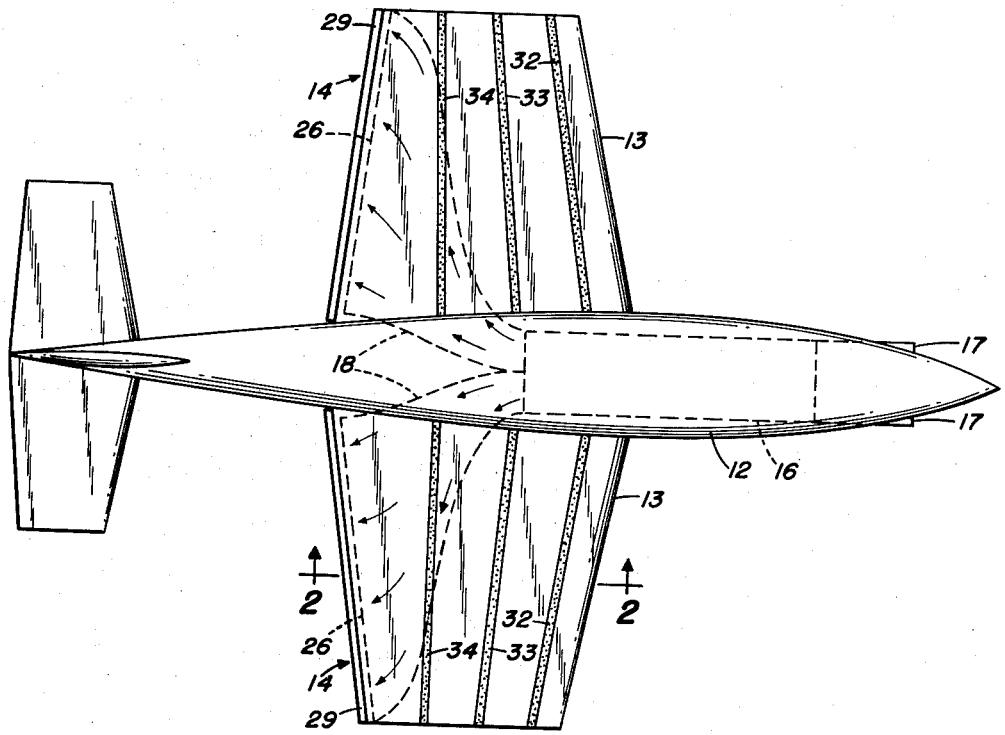
Figure 2:
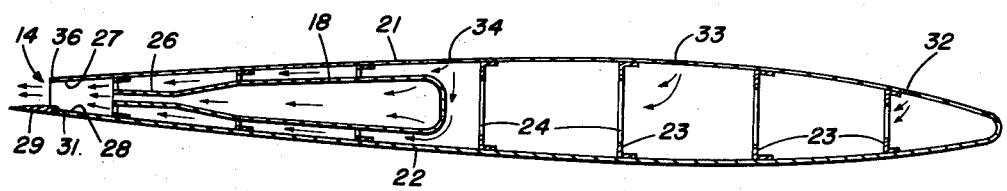

Other objects and many of the attendant advantages of this invention will be readily appreciated as the same become better understood by reference to the following detailed description when considered in connection with the accompanying drawings wherein:

FIG. 1 shows a plan view of a typical aircraft embodying the present invention, and FIG. 2 is a section taken on line 2—2 of FIG. 1.

Referring now to the drawing, wherein like reference characters designate like or corresponding parts throughout the various views, there is shown in FIG. 1 (which illustrates a preferred embodiment) a plan view of aircraft 11 having fuselage 12 and a wing 13. The basic or main body of wing 13 has a conventional airfoil shape but, as is seen in FIG. 2 the trailing edge 14 of the wing is open for most of its length to allow the ejection of a sheet of hot exhaust gases which serves to propel the aircraft. In the present embodiment aircraft 11 is powered by a single conventional turbo-jet engine 16 but more than one such engine could be utilized equally as well. Inlets 17, 17 are conventional and the design of both the inlets and the jet engines would depend upon the particular mission to be performed. Leading from turbo-jet engine 16 are exhaust ducts 18, 18 provided to conduct the hot exhaust gases through the wings for spanwise ejection aft at trailing edge 14. Exhaust ducts 18, 18, therefore, occupy a portion of the interior of the main body of wing 13 while the balance of the interior forms a plenum chamber 19 bounded by upper wing surface 21 and lower wing surface 22. Internal spars or ribs 23 are provided with lightening holes 24 to permit free passage of air to all parts of wing 13. Further, exhaust ducts 18, 18 are placed in wing 13 in spaced relationship with both the upper wing surface 21 and the lower wing surface 22. In this way air within plenum chamber 19 may freely pass to open trailing edge 14. As is shown, exhaust ducts 18, 18 extend substantially the entire span of wing 13. The exhaust ducts themselves have enlarged portions to accommodate the large mass flow of the entire exhaust from engine 16. In order to eject this exhaust aft in an efficient manner exhaust ducts 18, 18 are provided with exhaust nozzles or duct nozzles 26, 26 shaped to provide a continuous spanwise slot through which to expel the hot exhaust gases in a thin sheet. The point of ejection is forward of trailing edge 14 and duct nozzles 26, 26 are positioned to eject approximately midway between upper wing surface 21 and lower wing surface 22 at the point of ejection. Thus, in effect, duct nozzle 26, upper wing trailing edge interior surface 27 and lower wing trailing edge interior surface 28 form an air ejector. The primary flow is composed of the thin sheet of hot exhaust gases ejected from duct nozzle 26. Secondary air from within plenum chamber 19 is entrained by the primary flow and the resultant combined flow issues aft over a substantially full span "Coanda Effect" flap 29 pivotally joined to lower trailing edge 31. As this secondary air is exhausted, of course, it must be replaced and this is done by venting plenum chamber 19 through a series of perforated spanwise strips 32, 33, 34.

Of course, the number and locations of the perforated strips will be varied with the particular design. Thus by using the present system several functions are achieved: thrust to propel aircraft 11 is derived from the momentum of the aft-ejected sheet of combined flow; laminar suction boundary layer control is afforded by the pumping of the secondary air from within plenum chamber 19 with subsequent replenishment thereof through perforated strips 32, 33, 34; super-circulation and hence very high lift coefficients are produced by deflecting flap 29 to cause deflection of the ejected flow, and cooling of upper and lower wing trailing edge inner surfaces 27, 28 and upper and lower trailing edges 31, 36 by the continuously flowing secondary air passing between the basic structure and the hot exhaust duct-nozzle combination.

It will be readily seen therefore that as a result the present invention offers high speed performance without undue thrust penalties by employing a greater effective mass flow, drag reduction from the laminar boundary control, the elimination of some of the structure problems by cooling the basic wing structure by the secondary air flow and the reduction of premature boundary layer transition caused when the wing surfaces are hot.

Obviously many modifications and variations of the present invention are possible in the light of the above teachings. It is therefore to be understood that within the scope of the appended claims the invention may be practiced otherwise than as specifically described.

What is claimed is:

1. In an aircraft having a jet engine, a wing comprising a plenum chamber bounded by an upper wing surface and a lower wing surface, said surfaces being separated from one another along substantially all the trailing edge of said wing, a spanwise-extending flap pivotally joined to the lower trailing edge, an engine exhaust duct located within said plenum chamber extending spanwise thereof along the entire trailing edge of the wing and spaced from said upper and lower wing surfaces, spanwise-extending substantially parallel lips formed on said engine exhaust duct to cause the sheet-like ejection of total propulsive exhaust aft from said wing trailing edge, said substantially parallel lips being within said plenum chamber and ahead of the wing trailing edge and separated from said upper and lower wing surfaces, and a plurality of spaced spanwise strips of perforations through said upper surface whereby as propulsive exhaust leaves the ejecting means air from within said plenum chamber becomes entrained therein and the resultant combined flow issues aft to propel the aircraft while boundary layer air is sucked into said plenum chamber thorugh said perforations.

2. In an aircraft having a jet engine, a wing comprising a plenum chamber bounded by an upper wing surface and a lower wing surface, said surfaces being separated from one another along substantially all the trailing edge of said wing, a flap pivotally joined to the lower trailing edge extending substantially full span, an engine exhaust duct located within said plenum chamber extending substantially full span thereof and spaced from said upper and lower wing surfaces, a nozzle formed on said engine exhaust duct by substantially parallel lips extending substantially full span of said plenum chamber to cause the sheet-like ejection of total propulsive exhaust aft of said wing trailing edge, said nozzle being within said plenum chamber and separated from said upper and lower wing surfaces so that the nozzle and the upper and lower wing surfaces form concentric channels for the passage of exhaust and air from the plenum chamber, said nozzle being located forward of the open trailing edge of the wing, and a plurality of spaced spanwise strips of perforations through said upper surface whereby as propulsive exhaust leaves the ejecting means air from within said plenum chamber becomes entrained therein and the resultant combined flow issues aft to totally propel the aircraft while boundary layer air is sucked into said plenum chamber through said perforations.

3. In an aircraft having a jet engine, a wing comprising a plenum chamber bounded by an upper wing surface and a lower wing surface, said surfaces being separated from one another along substantially all the trailing edge of said wing, a spanwise-extending flap pivotally joined to the lower trailing edge, an engine exhaust duct located within said plenum chamber extending spanwise thereof and spaced from said upper and lower wing surfaces whereby the total exhaust is conducted, a spanwise exhaust nozzle affixed to said engine exhaust duct, said exhaust nozzle being within the plenum chamber and located forward of the separation between the wing surfaces which form the trailing wing edge so as to eject the propulsive gases aft from forward of said wing trailing edge in a sheet-like form proceeding aft in spaced relation to both said upper and lower wing surfaces, and air intake means penetrating said upper wing surface to permit boundary layer air to be inducted into said plenum chamber.

References Cited in the file of this patent
UNITED STATES PATENTS

| | | |
|---|---|---|
| 2,585,676 | Poisson-Quinton | Feb. 12, 1952 |
| 2,756,008 | Davidson | July 24, 1956 |
| 2,885,162 | Griswold | May 5, 1959 |